United States Patent
Kaneko

(10) Patent No.: US 9,289,882 B2
(45) Date of Patent: Mar. 22, 2016

(54) GRINDING TOOL WITH ECCENTRIC ROTATION SHAFT

(71) Applicant: KEITECH CO., LTD., Nishikasugai-gun, Aichi (JP)

(72) Inventor: Koji Kaneko, Nishikasugai-gun (JP)

(73) Assignee: KEITECH CO., LTD., Nishikasagai-gun (JP)

( * ) Notice: Subject to any disclaimer, the term of this patent is extended or adjusted under 35 U.S.C. 154(b) by 0 days.

(21) Appl. No.: 14/023,667

(22) Filed: Sep. 11, 2013

(65) Prior Publication Data
US 2014/0011435 A1     Jan. 9, 2014

Related U.S. Application Data

(63) Continuation of application No. PCT/JP2012/006622, filed on Oct. 17, 2012.

(30) Foreign Application Priority Data

Oct. 26, 2011   (JP) .................................. 2011-234551

(51) Int. Cl.
*B24D 7/16*  (2006.01)
*B24B 23/03*  (2006.01)
(Continued)

(52) U.S. Cl.
CPC . *B24D 7/16* (2013.01); *B24B 23/03* (2013.01); *B24B 47/12* (2013.01); *F16D 7/028* (2013.01)

(58) Field of Classification Search
CPC ........ B24B 23/03; B24B 23/04; B24B 23/02; B24B 23/005

USPC .......................... 451/135, 271, 270, 359, 357
See application file for complete search history.

(56) References Cited

U.S. PATENT DOCUMENTS 2,262,725 A * 11/1941 Indge ............................ 451/269
3,364,625 A    1/1968 Sogge
5,392,568 A *  2/1995 Howard et al. ............... 451/357
(Continued)

FOREIGN PATENT DOCUMENTS

EP     1 724 057 A2    11/2006
JP    02-071718 A      3/1990
(Continued)

OTHER PUBLICATIONS

International Search Report for PCT/JP20212/006622, Mailing Date of Nov. 27, 2013.
(Continued)

*Primary Examiner* — Monica Carter
*Assistant Examiner* — Lauren Beronja

(57) ABSTRACT

A grinding tool with an eccentric rotation shaft of a grinding disc with attached grinding material installed via a bearing at a position that is shifted from the central drive shaft line of a rotating disc fixed on a drive shaft, comprises a clutch in which a grinding disc-side clutch component member installed on the grinding disc or on the eccentric rotation shaft that is fixed to the grinding disc and a rotating disc-side clutch component member installed on the rotating disc are linked via a sliding surface capable of sliding and of transmitting the drive force. The rotation rate of the grinding disc is limited to a stable range of rotation rates, preventing extreme elevation in the rotation rate and extreme reduction in the rotation rate; the workpiece is ground efficiently; and the tool does not generate marks or patterns on the ground surface.

4 Claims, 4 Drawing Sheets

(51) Int. Cl.
*B24B 47/12* (2006.01)
*F16D 7/02* (2006.01)

(56) References Cited

U.S. PATENT DOCUMENTS 5,807,169 A * 9/1998 Martin et al. .................. 451/357
2010/0062695 A1 * 3/2010 Roehm et al. ................. 451/357

FOREIGN PATENT DOCUMENTS

| JP | 08-281548 A | 10/1996 |
| JP | 2001-219353 A | 8/2001 |
| JP | 2002-192452 A | 7/2002 |

OTHER PUBLICATIONS

European Search Report for European Patent Application No. 12844366.0, dated Oct. 21, 2015.

* cited by examiner

GRINDING TOOL WITH ECCENTRIC ROTATION SHAFT

TECHNICAL FIELD

The present invention relates to grinding tools, such as a sander, a grinder, and a polisher, which are machine tools for machining a surface of a workpiece by grinding or polishing the surface. In particular, the present invention relates to a so-called double action grinding tool or a random action grinding tool in which a rotation shaft of a grinding disc is disposed at an eccentric position displaced by a predetermined distance from the axis of a drive shaft.

BACKGROUND ART

With a grinding tool in which a rotation shaft of a grinding disc is rotatably attached at a position that is eccentric with respect to the axis of a drive shaft of a driving motor, the grinding disc performs an orbital motion around the drive shaft and a rotational motion about the rotation shaft. Therefore, such a grinding tool is usually called a "double action sander grinding tool" or a "random action grinding tool". FIG. 1 illustrates an eccentric rotation mechanism of such an existing grinding tool. In a grinding tool 1, an eccentric rotation shaft 4 of a grinding disc 3, to which an abrasive member 2 is attached, is rotatably attached to a rotary disc 7 through a bearing 9 at a position that is eccentric with respect to an axis 6 of a drive shaft 5, which is connected to a motor not shown), and the rotary disk 7 is fixed to the drive shaft 5. Therefore, the grinding tool 1 performs grinding as the grinding disc 3 performs an irregular and complex rotational motion. Therefore, not only grinding can be performed efficiently but also generation of conspicuous marks or patterns, which are called "aurora marks", can be prevented. Such marks and patterns are generated when a surface is ground by using an ordinary grinding tool that performs regular rotational motion, and they are observed when the surface, which appears to be smooth, is irradiated with light at a certain angle. Such marks and the like are generated because of very small and cyclical irregularities on the ground surface caused by regular rotation. It is possible to solve such a problem by using a grinding disc that performs an irregular rotational motion.

With the grinding tool 1, when the motor rotates the drive shaft 5, the rotary disc 7 rotates, and the grinding disc 3 performs an orbital motion, having an eccentric amount a as the radius, around the axis 6 of the drive shaft 5. The grinding disc 3 is rotatably attached to the rotary disc 7 through the eccentric rotation shaft 4 and the bearing 9. As the rotary disc 7 rotates, the grinding disc 3 rotates about an axis 8 of the eccentric rotation shaft 4 due to a driving force generated by friction between the eccentric rotation shaft 4 and the bearing 9. When the abrasive member 2 attached to the grinding disc 3 is not in contact with a workpiece and the grinding disc 3 is freely rotatable, the rotational speed of the grinding disc 3 about its axis increases to the rotational speed with which the rotary disc 7 is driven. If polishing or grinding is performed by pressing the abrasive member 2 against a surface of the workpiece after the rotational speed of the grinding disc 3 has increased to such a level, the grinding operation is performed impulsively. As a result, marks and scratches are formed on the surface of the workpiece. If the grinding disc 3 is strongly pressed against the workpiece, a brake is applied to the rotation of the grinding disc 3 about its axis, and the braking force becomes larger than a rotational force of the rotary disc 7, which is generated by friction between the rotation shaft 4 and the bearing 9. As a result, the rotation of the grinding disc 3 about its axis is stopped, and therefore the grinding performance is considerably reduced.

In order to prevent such a sharp increase in the rotational speed of the grinding disc about its axis when the grinding disc is unloaded and in order to prevent stopping of the rotation when the grinding disc is pressed against a surface to be ground, brakes and structures for transmitting a driving force for the rotation shaft of the grinding disc have been proposed as described in PTLs 1 to 3. PTL 1 describes a structure with which an increase in the rotational speed of a grinding disc is prevented by friction of braking means, which is an elastic functional ring attached to a casing of a driving motor. When the grinding disc is pressed against a workpiece, the braking means becomes deformed so as to mesh with the grinding disc. Due to such meshing, the grinding disc receives an active driving force from an eccentric member supporter (rotary disc). Therefore, the grinding disc can continue rotating when pressed against the workpiece. However, with this structure, braking for preventing an increase in the rotational speed of the grinding disc about its axis when the grinding disc is unloaded is performed by using friction between the rotation shaft and the elastic functional ring. Such a structure is inefficient because a brake is applied to the grinding disc before the rotational energy of the drive shaft is transmitted to a workpiece, and therefore energy loss is large. Moreover, because a driving force for maintaining a rotational force of the grinding disc is transmitted through the meshing between the braking means attached to the casing and the grinding disc, the grinding disc rotates in a direction opposite to the direction in which the eccentric member supporter (rotary disc) rotates, and the direction of rotation of the grinding disc changes instantaneously during grinding. Therefore, a large shock occurs, and the shock may affect a surface of a workpiece and may cause danger to an operator. Furthermore, the rotational speed of the grinding disc becomes constant relative to that of driving rotation, that is, the grinding disc does not rotate irregularly and smoothly. Therefore, this structure does not provide the function of a grinding tool having an eccentric rotation mechanism.

PTL 2 describes a grinding tool in which a device for limiting the rotational speed of a sanding disc (grinding disc) is attached to a housing (casing), and the device constantly transmits a force to the sanding disc. In the grinding tool, the device for limiting the rotational speed of the sanding disc is a hollow wheel that is connected through a partial bearing to the housing so as not to be rotatable relative to the housing. The connection can be released so that the sanding disc can freely rotate. Therefore, the rotational speed of the sanding disc can be controlled more smoothly than the grinding tool of PTL 1. However, in order to control the rotational speed and the direction of rotation of the sanding disc, it is necessary to perform precise calculations of at least the following: (1) the magnitudes and the directions of a friction moment of a bearing at an engagement portion and a friction moment between a first engagement portion and a second engagement portion; (2) the magnitude and the direction of a friction moment between an eccentric pin and a sanding disc bearing; and (3) the rotational speed and the rotational torque of a drive shaft. Moreover, the grinding tool, in which connection and disconnection of a locking device are performed and a clutch and the like, are used, has a complex mechanism. Furthermore, as in the case of PTL 1, a large shock occurs because the direction of rotation of the sanding disc changes instantaneously during a grinding operation, and the shock may affect a surface of a workpiece or may cause danger to an operator.

The grinding tool described in PTL 3, in which a driving force is directly transmitted to the grinding disc (grinding pad), controls rotation by applying forces in the axial direction to an inner race and an outer race of a bearing. Therefore, the grinding tool has a problem about the durability, which arises due to the structure of the bearing.

CITATION LIST

Patent Literature

PTL 1: Japanese Unexamined Patent Application Publication No. 2001-219353
PTL 2: Japanese Unexamined Patent Application Publication No. 2002-192452
PTL 3: Japanese Unexamined Patent Application Publication No. 3-201548

SUMMARY OF INVENTION

Technical Problem

The present invention provides a grinding tool in which an eccentric rotation shaft of a grinding disc is rotatably attached to a position that is eccentric with respect to the axis of a drive shaft of a driving motor, the grinding tool having the following advantage. The rotational speed of the grinding disc about its axis does not considerably increase when grinding is not performed and the grinding disc is unloaded, and an appropriate driving force is transmitted and the rotational speed of the grinding disc about its axis does not considerably decrease when grinding is performed and a load is applied to the grinding disc. Thus, the rotational speed of the grinding disc about its axis is controlled in a stable range, so that a workpiece can be efficiently ground and marks or patterns are not generated on a ground surface.

Solution to Problem

According to the present invention, in a grinding tool in which an eccentric rotation shaft of a grinding disc (to which an abrasive member is attached) is attached through a bearing to a rotary disc at a position that is eccentric with respect to an axis of a drive shaft connected to a motor, the rotary disc being fixed to the drive shaft, the grinding tool includes a clutch including a grinding-disc-side clutch member and a rotary-disc-side clutch member that are connected to each other along a sliding surface that is capable of sliding and capable of transmitting a driving force, the grinding-disc-side clutch member being attached to the grinding disc or to the eccentric rotation shaft fixed to the grinding disc, the rotary-disc-side clutch member being attached to the rotary disc.

It is preferable that the sliding surface include at least a set of conical shapes. Moreover, it is preferable that one of the clutch members be made of a plastic material and the other clutch member be made of a metal material. The plastic material is a material having high heat resistance and high wear resistance. For example, a fluorocarbon resin, PEEK (polyether ether ketone), a polyamide-imide, or a fiber reinforcement of such a material is preferably used. As the metal material, a metal such as steel, a copper alloy, an aluminum alloy, or a white metal, or a sintered metal impregnated with a liquid lubricant is preferably used.

In the grinding tool according to the present invention, the grinding-disc-side clutch member, which is attached to the grinding disc or to the eccentric rotation shaft, and the rotary-disc-side clutch member, which is attached to the rotary disc, are connected so as to be capable of sliding and capable of transmitting a driving force. That is, these clutch members are in a so-called partially engaged state. Therefore, a driving force for the rotary disc is transmitted by the friction of the sliding surface of the clutch members. Moreover, the rotation of the eccentric rotation shaft about its axis is controlled, because the friction of the sliding surface is larger than the friction of the bearing.

Advantageous Effects of Invention

The clutch members of the grinding tool described above have a sliding surface that is capable of sliding and capable of transmitting a driving force. When grinding is not performed and the grinding disc is unloaded, the sliding surface of the clutch members performs a braking function to prevent a considerable increase in the rotational speed of the grinding disc about its axis. When grinding is performed and a load is applied to the grinding disc, a driving force from the rotary disc is transmitted to the grinding disc by using the friction of the sliding surface, and therefore the rotational speed of the grinding disc about its axis can be maintained. Thus, during a grinding operation, the rotational speed of the rotary disc, that is, the rotational speed of the grinding disc, can be adjusted by adjusting the rotational speed of the motor, and the rotational speed of the grinding disc about its axis can also be adjusted by appropriately adjusting a force with which the abrasive member attached to the grinding disc is pressed against a surface of a workpiece. Accordingly, the grinding disc can perform a rotational motion in which a rotational motion about its axis and an orbital motion are combined in a complex way.

Therefore, by using the grinding tool according to the present invention, when grinding a workpiece by a large grinding amount, a smoothly ground surface can be obtained despite the large grinding amount due to the complex and active rotational motion of the grinding disc. Moreover, a beautifully delustered surface can be obtained, and the operation can be efficiently performed. Furthermore, buffing can be performed without generating marks and patterns on a buffed surface. With the grinding tool, although rotation of the grinding disc is complex and irregular, the direction of rotation of the grinding disc about its axis is the same as the direction of rotation of the rotary disc, so that driving energy loss is small, shock due to an instantaneous change in the direction of rotation does not occur during grinding, and a grinding operation can be performed safely. Accordingly, the grinding tool according to the present invention can be preferably used as a tool for grinding, which is called a grinder or a sander, and as a tool for polishing, which is called a polisher.

DESCRIPTION OF EMBODIMENTS

Embodiments of the present invention will be described. in detail with reference to the drawings.

Figure 1:
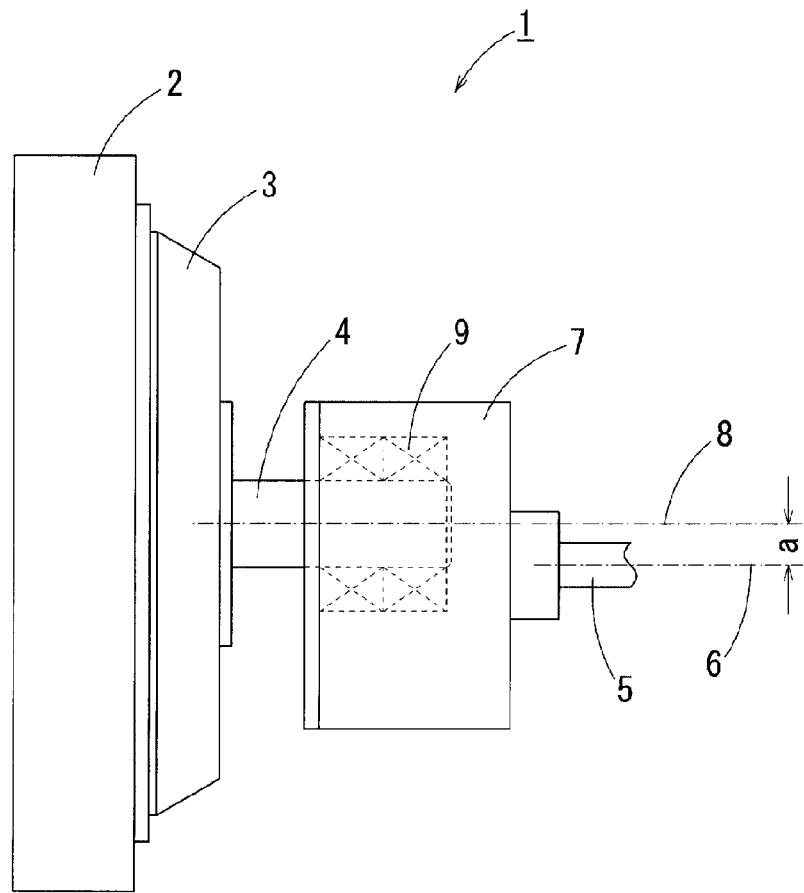
FIG. 1 illustrates an eccentric rotation mechanism of an existing grinding tool.
Figure 2:
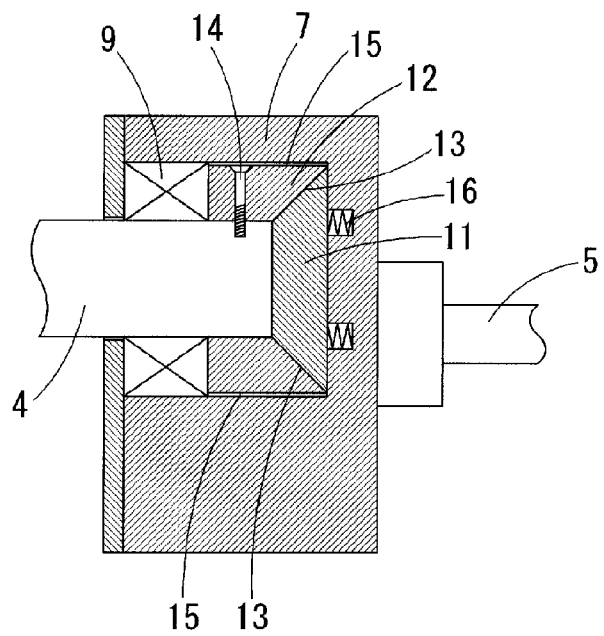
FIG. 2 is a sectional view of clutch members attached to a rotary disc and to an eccentric rotation shaft.

FIG. 2 is a sectional view of clutch members attached to a rotary disc and to an eccentric rotation shaft according to the present invention. Although not illustrated in FIG. 2, a grinding disc 3 is fixed to an end of an eccentric rotation shaft 4, and an abrasive member 2 is attached to the grinding disc 3 as in FIG. 1. Likewise, although not illustrated, a driving motor is connected to an end of a drive shaft 5. A rotary disc 7 is rotated by a driving force of a motor. As described above with reference to FIG. 1, the eccentric rotation shaft 4 is attached to a position that is eccentric with respect to the drive shaft 5. When the motor rotates the drive shaft 5, the rotary disc 7 rotates and the eccentric rotation shaft 4 performs an orbital motion. Moreover, the eccentric rotation shaft 4, which is attached to the rotary disc 7 through a bearing 9, performs a rotational motion about its axis.

In FIG. 2, the eccentric rotation shaft 4 is attached to the rotary disc 7 through the bearing 9. A grinding-disc-side clutch member 12 is fixed to the eccentric rotation shaft 4 using a clutch attachment screw 14. A rotary-disc-side clutch member 11 and push springs 16 are attached to the rotary disc 7 in such a way that the rotary disc 7 and the clutch member 11 are movable relative to each other and elastic forces of the push springs 16 can be transmitted to the clutch member 11. The rotary-disc-side clutch member 11 and the grinding-disc-side clutch member 12 are disposed so as to be in close contact with each other along a sliding surface 13 having a conical shape. The sliding surface 13 is capable of sliding and capable of transmitting a driving force. The friction of the sliding surface 13 is larger than the friction of the bearing 9. When the rotational speed of the eccentric, rotation shaft 4 about its axis increases considerably, the sliding surface 13 functions as a brake. When the rotational speed of the eccentric rotation shaft 4 about its axis decreases, the sliding surface 13 functions to transmit a driving force. A force that presses the clutch members 11 and 12 against each other can be adjusted by adjusting the elastic forces of the push springs 16. Braking power and the ability to transmit a driving force can be increased by using springs having larger elastic forces or by compressing the springs more strongly. Braking power and the ability to transmit a driving force can be decreased by making adjustment in the opposite way. The eccentric rotation shaft 4 is attached through the bearing 9 in such a way that a gap 15 is formed between the rotary disc 7 and the grinding-disc-side clutch member 12, so that the function of the sliding surface 13 described above may not be hindered.

As described above, the clutch members 11 and 12 are partially engaged all the time, and the sliding surface 13 is capable of sliding and capable of transmitting a driving force. The grinding tool, having such a combination of clutch members, has high grinding performance and workability as described above. It is preferable that to sliding surface 13 have a conical shape, with which a large surface area can be easily provided. However, the shape of the sliding surface is not particularly limited, and may be disc-shaped.

Figure 3:
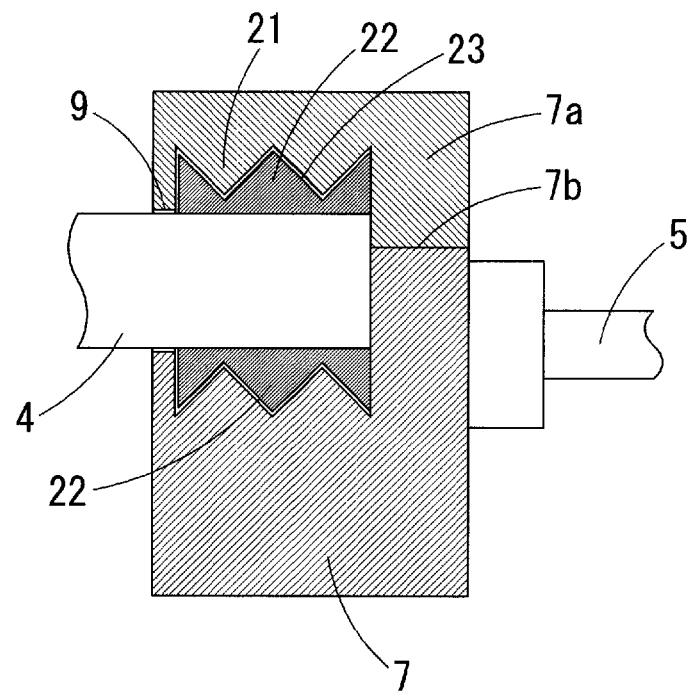
FIG. 3 is a sectional view of clutch members according to another embodiment.
Figure 4:
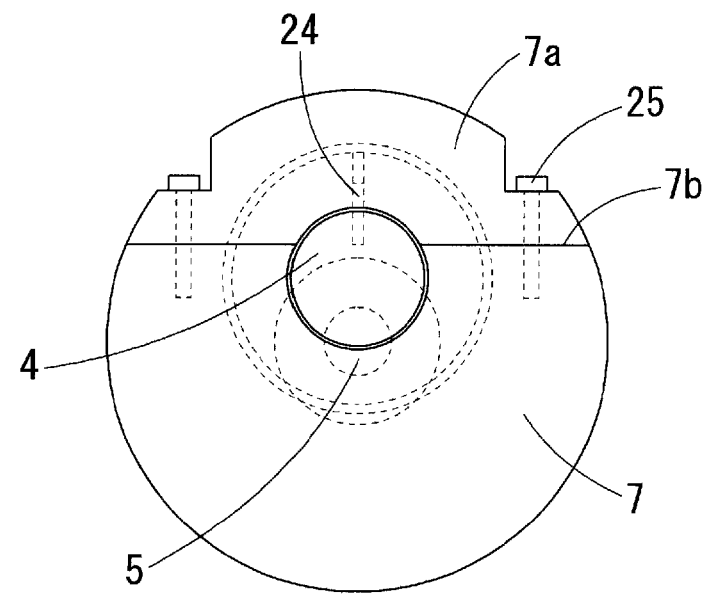
FIG. 4 is a top view of a rotary disc to which the clutch members illustrated in FIG. 3 are attached.

FIGS. 3 and 4 illustrate clutch members according to another embodiment. FIG. 3 is a sectional view, and FIG. 4 is a top view. In the clutch members according to the present embodiment, a sliding surface 23 includes a plurality of conical shapes. A grinding-disc-side clutch member 22 is fixed to an eccentric rotation shaft 4, and a rotary-disc-side clutch member 21 is formed by cutting a rotary disc 7. Because the sliding surface 23 includes four conical surfaces, the rotary disc 7 is divided along a segment surface 7b, a segment 7a is removed, and the eccentric rotation shaft 4 is set while fixing the grinding-disc-side clutch member 22 to the eccentric rotation shaft 4. Then, the segment 7a, which has been removed, is fixed to the rotary disc 7 using connection screws 25. The grinding-disc-side clutch member 22 is attached to the eccentric rotation shaft 4 using an attachment screw 24. The rotary-disc-side clutch member 21 may be made not by cutting the rotary disc 7 but by fixing a clutch member on which the sliding surface 23 having the same shape has been formed to the rotary disc 7. In the embodiment illustrated in FIG. 3, a bearing 9 is not necessary because the clutch members also function as a bearing. However, a metal bearing is used in the embodiment.

Figure 5:
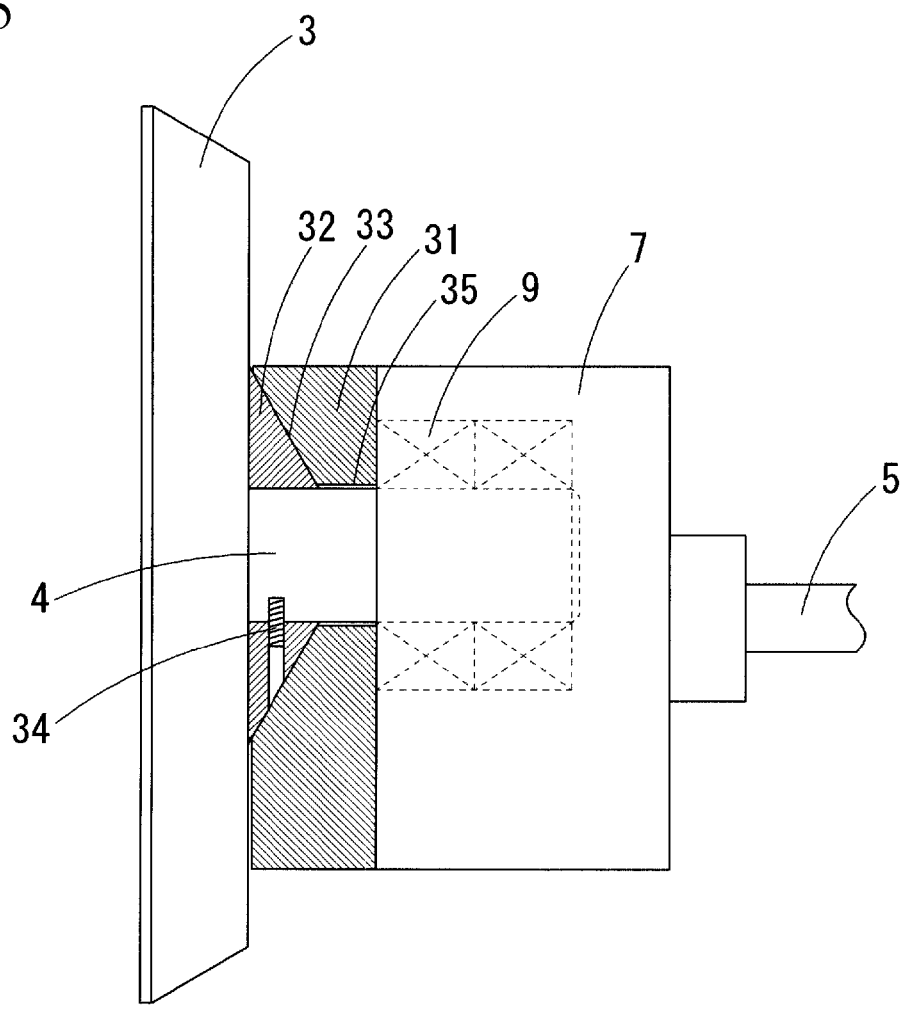
FIG. 5 is a sectional view of clutch members attached to a rotary disc and to a grinding disc.

FIG. 5 illustrates an embodiment in which a grinding-disc-side clutch member is directly attached to a grinding disc. In this embodiment, a grinding-disc-side clutch member 32 is attached to a grinding disc 3. In FIG. 5, a clutch attachment screw 34 is screwed into an eccentric rotation shaft 4. Alternatively, the attachment screw 34 may be screwed into the grinding disc 3. A rotary-disc-side clutch member 31 is fixed to an upper surface of a rotary 7. The clutch members 31 and 32 are disposed so as to be in close contact with each other along a sliding surface 33 having a conical shape. The rotary-disc-side clutch member 31 and the rotation shaft 4 are not in direct contact with each other, and a gap 35 is formed therebetween. The grinding disc 3 is connected to the rotary disc 7 along the sliding surface 33. As with the rotary-disc-side clutch member 11 in FIG. 2, the rotary-disc-side clutch member 31 may be attached to the rotary disc 7 in such a way that they are movable relative to each other and the rotary-disc-side clutch member 31 can be pressed against the grinding-disc-side clutch member 32 by using push springs.

Figure 6:
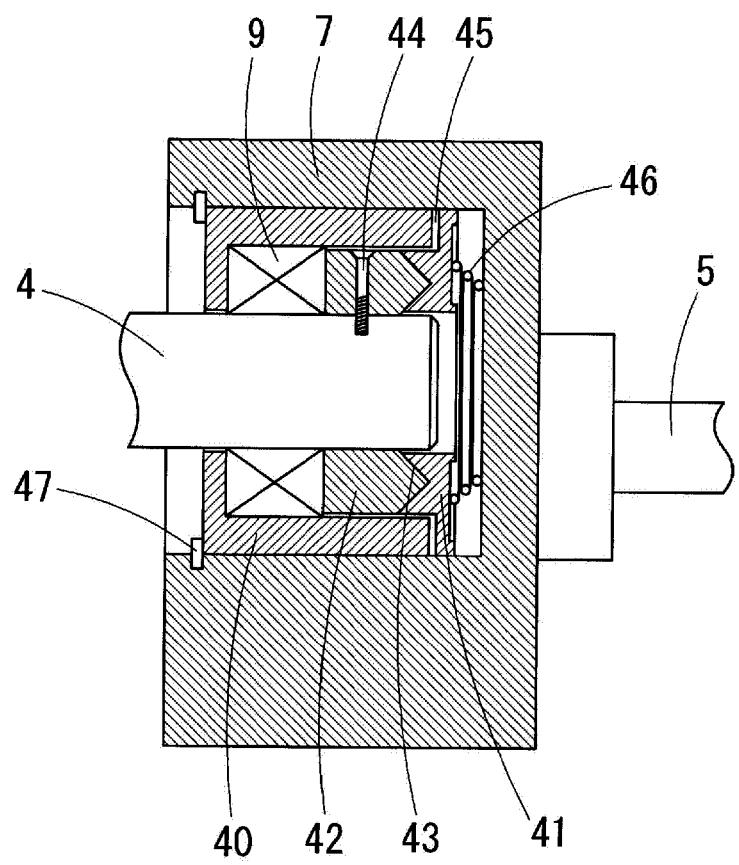
FIG. 6 is a sectional view of an embodiment in which part of the clutch members illustrated in FIG. 2 is modified.

FIG. 6 is a sectional view of an embodiment in which part the clutch members illustrated in FIG. 2 is modified. In the present embodiment, an eccentric rotation shaft 4 for driving a grinding disc is attached to an inner casing 40, which is connected to a rotary disc 7, through a bearing 9. A sliding surface 43 of the clutch members includes a combination of two conical shapes. A grinding-disc-side clutch member 42 has a convex ring-like shape, and a rotary-disc-side clutch member 41 has a concave ring-like shape. The convex and concave surfaces of the clutch members, which are in close contact with each other, form the sliding surface 43. The grinding-disc-side clutch member 42 is attached to the eccentric rotation shaft 4 using a clutch attachment screw 44. The rotary-disc-side clutch member 41 is attached to the rotary disc 7 through a push spring 46. The inner casing 40 is connected and fixed to the rotary disc 7 by a pressing force of the push spring 46, which is applied via the clutch members 41 and 42 and the bearing 9, and by retention using a snap ring 47. With such a structure, in the case where the bearing 9 is used, damage to the bearing due to a force in the axial direction can be prevented.

As in other embodiments, the sliding surface 43 according to the present embodiment is capable of sliding and capable of transmitting a driving force. The friction of the sliding surface 43 is larger than the friction of the bearing 9. When the rotational speed of the eccentric rotation shaft 4 about its axis increases considerably, the sliding surface 43 functions as a brake When the rotational speed of the eccentric rotation shaft 4 about its axis decreases, the sliding surface 43 functions to transmit a driving force. A force that presses the clutch members 41 and 42 against each other can be adjusted by adjusting the elastic forces of the push spring 46. In the present embodiment, it is preferable that the grinding-disc-side clutch member 42 be made of a plastic material and the rotary-disc-side clutch member 41 be made of a metal material. In present embodiment, a polyamide-imide is used as the plastic material, and steel (S45C) is used as the metal material. With this structure, as the grinding tool is used over a long period, the grinding-disc-side clutch member 42, which is made of a plastic material, wears along the sliding surface. As the wear develops, the rotary-disc-side clutch member 41, which is made of a metal material, advances upward and may cause trouble in the rotation mechanism. However, with the embodiment illustrated in FIG. 6, such an upward advancement of the rotary-disc-side clutch member 41 can be limited, because a gap 45, which is formed between a peripheral edge portion of the rotary-disc-side clutch member 41 and a lower edge portion of the inner casing 40, becomes narrower and eventually eliminated. The presence/absence of the gap 45 may be used as an indicator of a replacement time of the grinding-disc-side clutch member 42.

In any of the embodiments described above, they grinding disc 3 and the rotary disc 7 are connected to each other and partially engaged with each other along a sliding surface that is capable of sliding and capable of transmitting a driving force. Therefore, during a grinding operation, the grinding disc 3 performs a rotational motion in which a rotational motion and an orbital motion are combined in a complex way as described above, so that an efficient grinding operation can be realized.

Metals and plastic materials can be used as the materials of the clutch members. As described above, it is preferable that a combination of a plastic material and a metal material be used. As the plastic material, a material having high heat resistance and high wear resistance is used. As described above, it is preferable that the plastic material be a fluorocarbon resin, PEEK (polyether ether ketone), a polyamide-imide, or a fiber-reinforcement of such a martial. It is preferable that the fiber be glass fiber or carbon fiber. It is preferable that the fluorocarbon resin be PTFE (polytetrafluoroethylene). Alternatively, a copolymer of tetrafluoroethylene and chlorotrifluoroethylene, ethylene, hexafluoropropylene, or the like may be used. Examples of other usable plastic materials having high heat resistance and high wear resistance include polyacetal (polyoxymethylene), polyetherketone, and polyethersulfone. Examples of usable metal materials include steel; a copper alloy, such as bronze, lead bronze, phosphor bronze, or the like; an aluminum alloy; a white metal; an oil-impregnated sintered metal material, such as that of iron, a copper alloy, or an iron copper alloy; and a sintered material that is a combination of such a metal and graphite. The clutch members are manufactured by molding, casting, or cutting such a material. As necessary, a lubricant such as a lubrication oil may be applied to the sliding surface.

The present invention is not limited to the embodiments described above, and the embodiments may be modified within the spirit and scope of the present invention.

REFERENCE SIGNS LIST 1 existing grinding tool
2 abrasive member
3 grinding disc
4 eccentric rotation shaft
5 drive shaft
6 axis of drive shaft
7 rotary disc
7a rotary disc segment
7b rotary disc segment surface
8 axis of eccentric rotation shaft
9 bearing
11 rotary-disc-side clutch member
12 grinding-disc-side clutch member
13 sliding surface
14 clutch attachment screw
15 gap
16 push spring
22 grinding-disc-side clutch member
24 clutch attachment screw
25 rotary disc connection screw
31 rotary-disc-side clutch member
32 grinding-disc-side clutch member
33 sliding surface
34 clutch attachment screw
35 gap
40 inner casing
41 rotary-disc-side clutch member
42 grinding-disc-side clutch member
43 sliding surface
44 clutch attachment screw
46 gap
45 push spring
47 snap ring
a eccentric amount

The invention claimed is:

1. A grinding tool comprising:
a motor having a drive shaft connected thereto;
a rotary disc fixed to the drive shaft defining an axis of rotation for the rotary disc; and
a grinding disc to which an abrasive member is attached, the grinding disc including:
an eccentric rotation shaft defining an axis of rotation of the grinding disc, the eccentric rotation shaft being attached through a bearing to the rotary disc at a position that is eccentric with respect to an axis of the drive shaft; and
a clutch including a grinding-disc-side clutch member and a rotary-disc-side clutch member that are connected to each other along a sliding surface that is capable of sliding and capable of transmitting a driving force, the grinding-disc-side clutch member being attached to the grinding disc or to the eccentric rotation shaft fixed to the grinding disc, the rotary-disc-side clutch member being attached to the rotary disc.

2. The grinding tool according to claim 1, wherein the sliding surface includes at least a set of conical shapes.

3. The grinding tool according to claim 1 or 2, wherein one of the clutch members is made of a plastic material and the other clutch member is made of a metal material.

4. The grinding tool according to claim 3, wherein the plastic material is a plastic material selected from a fluorocarbon resin, PEEK (polyether ether ketone), and a polyamide-imide, or a fiber reinforcement of the selected material.

* * * * *